United States Patent [19]

Yamada

[11] Patent Number: 4,653,132

[45] Date of Patent: Mar. 31, 1987

[54] METHOD OF MAKING PLUG-CONTAINING TYPE INTERNALLY THREADED ANCHOR

[75] Inventor: Takao Yamada, Higashi-Osaka, Japan

[73] Assignee: Kensetsu Fastener Kabushiki Kaisha, Osaka, Japan

[21] Appl. No.: 815,597

[22] Filed: Dec. 31, 1985

Related U.S. Application Data

[62] Division of Ser. No. 659,153, Oct. 9, 1984, abandoned.

[30] Foreign Application Priority Data

Apr. 13, 1984 [JP] Japan .................. 59-75625

[51] Int. Cl.$^4$ .................. B21K 1/44; B21K 1/58; B21K 1/64; B21K 9/00
[52] U.S. Cl. .................. 10/27 PH; 29/437; 29/445; 29/456; 29/509; 411/45; 411/60
[58] Field of Search .................. 29/445, 456, 437, 509, 29/525; 411/30, 31, 41, 44, 45, 57, 60; 10/27 E, 27 PH

[56] References Cited

U.S. PATENT DOCUMENTS

| | | | |
|---|---|---|---|
| 1,000,715 | 8/1911 | Caywood | 411/60 |
| 1,418,524 | 6/1922 | Bronson | 411/57 X |
| 2,027,922 | 1/1936 | McNaught | 10/27 PH UX |
| 2,320,862 | 6/1943 | Goodman | 10/27 PH X |
| 2,900,203 | 8/1959 | Hayden | 29/437 X |
| 3,346,935 | 10/1967 | Lyon | 29/437 X |
| 3,729,217 | 4/1973 | Metcalf | 29/437 |
| 4,520,521 | 6/1985 | Miyake | 10/27 PH |

FOREIGN PATENT DOCUMENTS

| | | | |
|---|---|---|---|
| 2652630 | 5/1978 | Fed. Rep. of Germany | 411/44 |
| 2910406 | 9/1980 | Fed. Rep. of Germany | 10/27 PH |

Primary Examiner—Charlie T. Moon
Attorney, Agent, or Firm—Armstrong, Nikaido, Marmelstein & Kubovcik

[57] ABSTRACT

The present invention relates to a plug-containing type internally threaded anchor to be set in concrete which is used to optionally and firmly fix hardware, such as ceiling members, floor members and wall members, to the surface of a concrete structure and it also relates to a method of producing the same which promises mass-production effect. The invention is characterized in that as a means for preventing the plug contained in the anchor body from accidentally slipping off owing to vibration, shock or other external forces exerted during transport or laying operation, the anchor body is formed with an internal thread by rolling whose internal diameter is smaller than the outer diameter of the plug, so that the crest portion of the internal thread bulging by a predetermined amount above the anchor body holds the plug in slip-off preventing condition.

2 Claims, 7 Drawing Figures

METHOD OF MAKING PLUG-CONTAINING TYPE INTERNALLY THREADED ANCHOR

This is a division of application Ser. No. 659,153 filed Oct. 9, 1984 now abandoned.

BACKGROUND OF THE INVENTION

Generally, a plug-containing type internally threaded anchor to be set in concrete is known which is used to firmly fix ceiling member, floor members, wall members or other hardware to the surface of a concrete structure by inserting the plug into the hollow inner space of the anchor body, hammering a driving rod to drive in the plug to spread the anchor body from its front end to thereby fixedly embed the anchor in an embedment hole formed in the concrete structure, and finally driving a male screw into the internal thread. For prevention of slip-off of the plug, the prior art resorts to a means shown in FIG. 5.

This will be later described in detail, but here suffice it to say that since the internal thread integrally formed in the anchor body by cutting has an opening with a greater inner diameter than the outer diameter of the plug because of the need to make it possible to insert the plug into the anchor body, there is, of course, the danger of the plug slipping off the anchor body. For this reason, it has been common practice to use grease or an adhesive agent to hold the plug in fixed condition in the anchor.

Whether an adhesive agent is applied to the plug or whether grease is injected into the anchor body after the plug has been inserted into the anchor body, however, in addition to a manual operation required for each anchor body it is necessary to fix the plug in the anchor body and hence not only is there a possibility of omission of application of adhesive agent or grease but also the operation involved is very troublesome, leading to high cost and delayed shipment of the product.

Further, the fixed condition of the plugs inevitably varies in completeness and in accuracy of uniformity. For example, if there is a drying or omission of application of adhesive agent or grease, this can result in plugs slipping off the anchor bodies under vibration, shock or other external forces during transport to the laying site or during laying operation, which slip-off often poses problems decreasing the efficiency of operation, particularly a laying operation which requires the operator to look upward, as in suspending a ceiling member from a concrete structure.

Another known technique is disclosed in Japanese Utility Model Publication No. 3384/1969, which technique, as will be later described with reference to FIGS. 6 and 7, consists in squeezing the anchor body by press operation subsequent to insertion of the plug, so as to form a reduced-diamered neck portion intended to prevent slip-off of the plug.

With this technique, whose problems will be later described in comparison with an embodiment of the present invention, however, the processing steps of forming the internal thread by cutting and of squeezing the anchor body by press operation prior to said thread cutting are indispensable; thus, at least two steps are required in production and corresponding machining equipement has to be prepared; thus, there is a problem that for such mass-consumed machine element, mass-production effect cannot be expected to the fullest extent.

SUMMARY OF THE INVENTION

The present invention is directed to such concrete-embedded anchor of internally threaded form having a plug held or contained therein, designed to overcome the aforesaid problems accompanying the prior art.

Accordingly, a first object of the invention is to provide an anchor superior in operability at laying sites, wherein a plug is inserted into a substantially hollow cylinderical sleeve type anchor body and then an internal thread whose inner diameter is smaller than the outer diameter of the plug is formed in the anchor body by rolling, so that the crest portion of the internal thread bulging by a predetermined amount holds the plug in slip-off preventing condition.

A second object of the invention is to provide an arrangement wherein prevention of slip-off of the plug from the anchor body is attained solely by the formation of the internal thread by rolling so as to develop mass-production effect to the fullest extent, the surface of the internal thread, as compared with such internal thread formed by cutting with a drill, being effectively work-hardened by the action of plastic deformation of the metal blank, thereby improving its mechanical properties.

Other objects of the invention will become apparent from the following description to be given with reference to a preferred embodiment thereof, particularly from the description to be given in comparison with the prior art shown in FIGS. 5 through 7.

DESCRIPTION OF THE PREFERRED EMBODIMENTS

Figure 1:
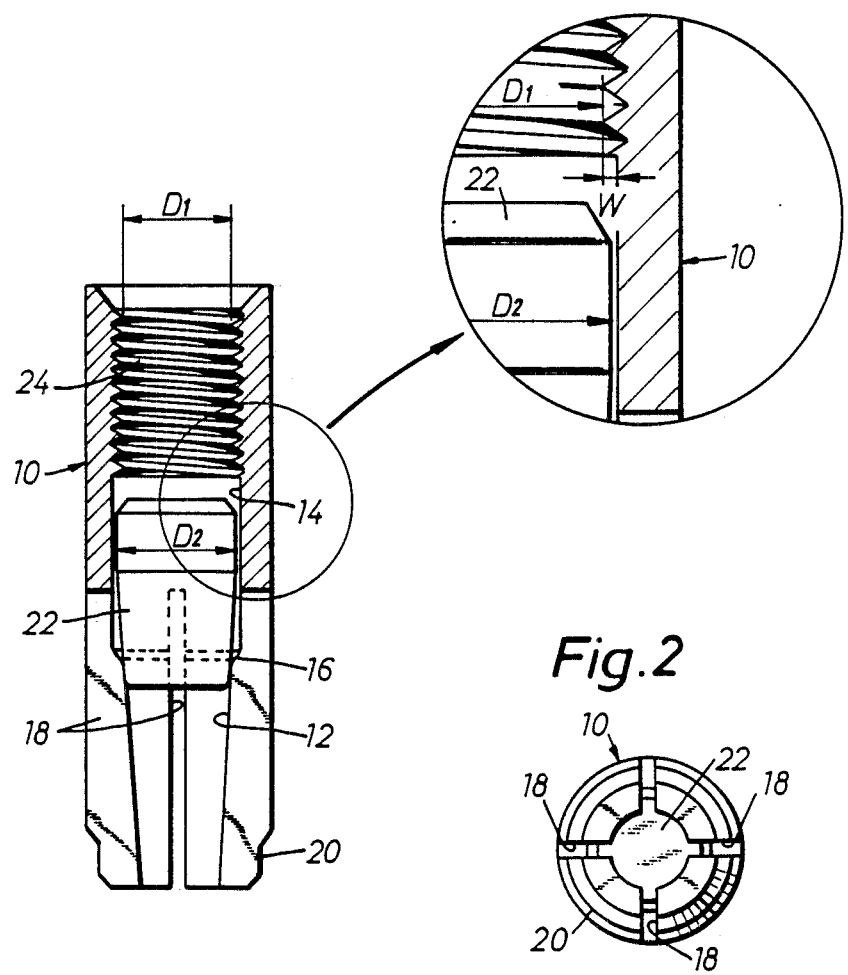
FIG. 1 is a sectional view of a plug containing type internally threaded anchor to be set in concrete according to the present invention, part of the anchor being separately shown on an enlarged scale.
Figure 2:
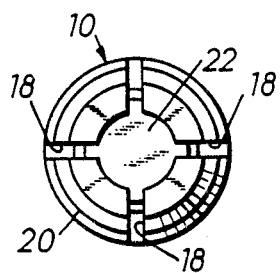
FIG. 2 is a bottom view of the anchor.
Figure 3:
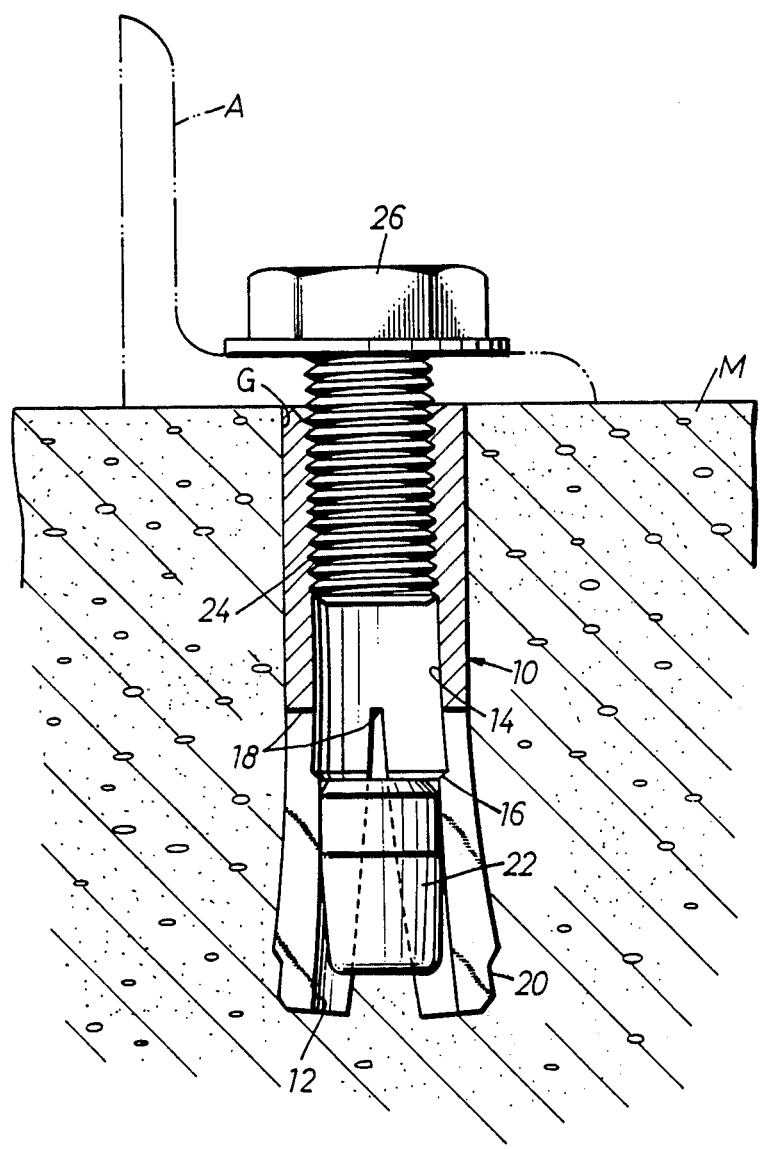
FIG. 3 is a sectional view showing the anchor embeded in a concrete structure.

FIGS. 1 through 3 show a plug containing type internally threaded anchor to be embedded in concrete and how it is embedded in concrete when used. The numeral 10 denotes a heat-treated anchor body of special steel, having on its front end side to be driven into a concrete structure M a taper hole 12 of small diameter and on its base side serving for attachment of a ceiling member, floor member, wall member or other hardware A a straight hole 14 of large diameter, said holes axially communicating with each other, the anchor body being substantially in the form of a hollow cylindrical sleeve.

The opening edge of the straight hole 14 forms a frustoconical surface to make it easier to insert a plug driving rod and a male screw to be later described into the anchor body 10. The numeral 16 denotes a boundary step portion between the holes 12 and 14 of different diameters, which is located at a position somewhat deviated toward the front end side from the middle of the overall length L1 of the anchor body 10. The numeral 18 denotes a plurality of lengthwise extending slits cut in the anchor body 10 over substantially the front half of the length and, as can be seen from FIG. 2, presenting a plus-sign or minus-sign form to assist in spreading the front end side of the anchor body 10. Though not shown, the outer surface of the front end side may be roughend as by broaching or knurling to provide increased grip on the concrete structure M. The numeral 20 denotes a small-diametered front end step portion on the outer surface of the anchor body 10 to ensure smooth operation for embedment in the concrete structure M.

The numeral 22 denotes a plug or head inserted into the hollow inner space of said anchor body 10 from the straight hole 14 of large diameter on the base end side. The plug is made of a heat-treated special steel mass substantially in the form of a frustum or bullet adapted to contact the taper surface of said taper hole 12 to exert a wedge action. The plug 22 is about one-third as long as the anchor body 10 and in its inserted state it will be self-held at the intermediate position in said anchor body 10.

The numeral 24 denotes an internal thread formed on the base end side of the anchor body 10 for preventing slip-off of the plug 22 inserted in the anchor 10, said internal thread being formed in said straight hole 14 by rolling.

Thus, as is clear from the enlarged extracted portion of FIG. 1, the inner diameter D1 of the internal thread 24 bulged by rolling is smaller than the outer diameter D2 of said plug 22, so that the crest portion of the internal thread 24 bulging by a predetermined amount W serves to hold the plug 22 under restraint to prevent it from slipping off the anchor body 10.

Further, since the internal thread 24 is formed by being subjected to the action of what is called rolling which involves plastic deformation of metal blank, it is work-hardened into a fiber structure continuous on the thread surface, and in contrast with cutting process with a drill, rolling process does not produce cutting chips and hence the blank itself can be fully utilized without any loss of material, of course, and its mechanical properties are effectively improved. Since the anchor, when used, is embedded in the concrete structure, said internal thread 24 is adapted to receive a male screw 26 for attaching hardware A to clamp the latter in position. Thus, the internal thread 24 has the dual function of threaded engagement with the male screw 26 and of prevention of slipping-off of the plug 22.

The anchor of the present invention constructed in the manner described above contains the plug 22 in slip-off preventing condition and, when used, it is embedded in the embedment hole G of the concrete structure M and then driven in by hammering an unillustrared suitable driving rod abutting against the plug 22, producing a forcible spreading action starting at the slits 18, whereby the anchor firmly grips the concrete structure M to become integral with the latter. Thus, by subsequently threadedly engaging the male screw 26 with the internal thread 24 for clamping, it is possible to firmly fix a ceiling member, floor member or other hardware A to the surface of the concrete structure. In addition, in the figure, the male screw 26 is shown as a common hexagon headed bolt, but it is, of course, not limited thereto, and various forms of male screw may be used in correlation with the hardware A.

Figure 4:
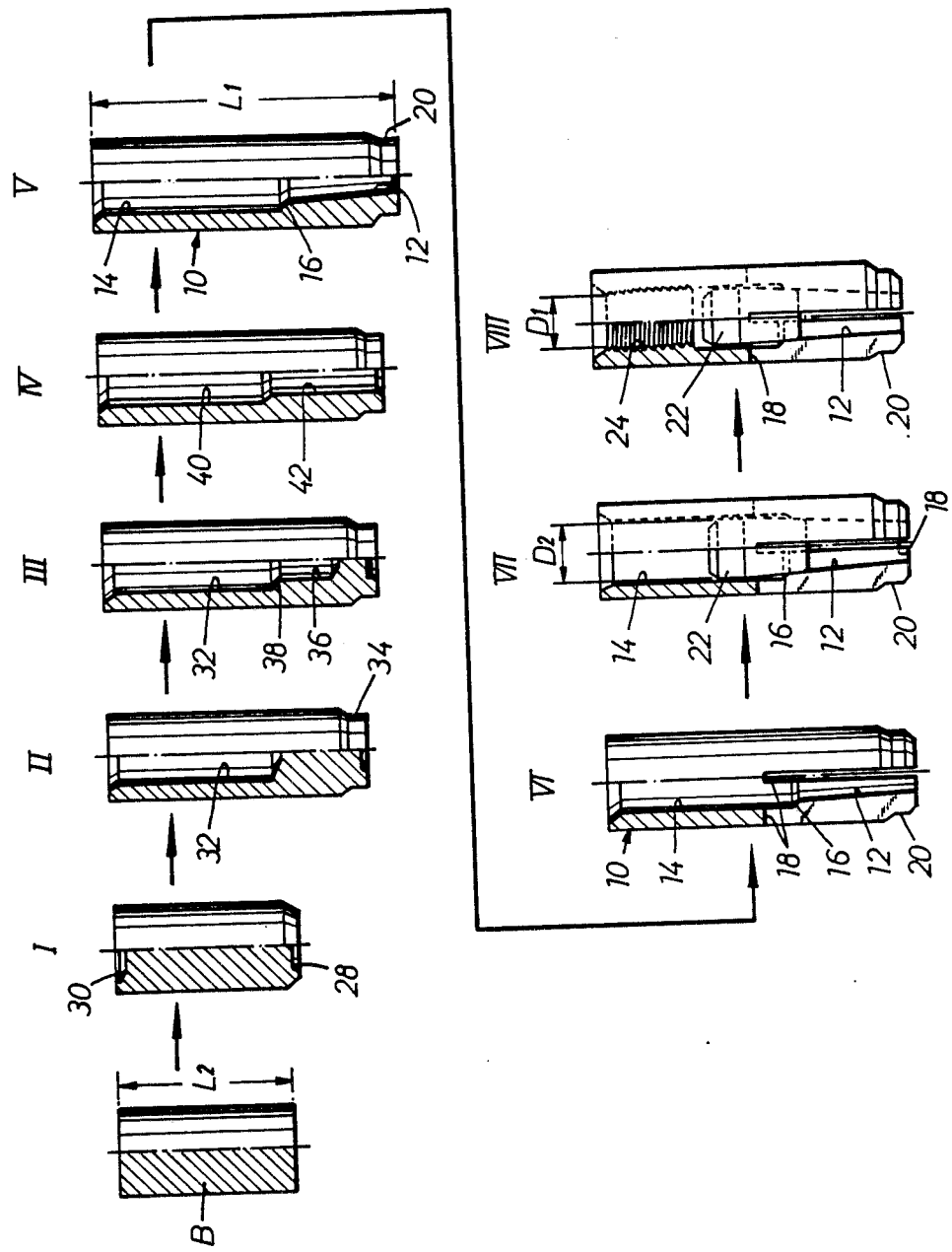
FIG. 4 is a half-sectional view showing the order of manufacture of the anchor according to the invention.

FIG. 4 is a half-sectional view of the anchor various processing steps, showing the order or production of the anchor of the present invention. In production, as is clear from arrows shown therein, the anchor body 10 is stepwise formed by forging, particularly cold forging, followed by the cutting of said slits, the insertion of the plug 22, and the rolling formation of the internal thread 24.

More particularly, a round bar blank B of special steel of fixed diameter cut to a predetermined length L2 is prepared. Starting with this, at the first step I, relatively shallow recesses 28 and 30 are formed in the opposite cut ends as by an unillustrated former. In this case, the recess 28 on the front end side is made somewhat smaller in diameter than the recess 30 on the base end side, said recesses being in the form of frustums of different diameters.

Then, at the second step II, the blank B is deep-drawn from the recess 30 on its base end side by a round bar-like punch (not shown) to preform a deep large-diametered recess 32 capable of providing the straight hole 14 of said product, and concurrently therewith a front end step portion 34 of reduced diamter is formed on the outer peripheral surface of the blank B. This step portion 34 corresponds to the front end step portion 20 of said product and can be formed by a die (not shown) which receives a punch.

Subsequently, at the third step III, a separate round bar-like punch (not shown) is thrusted in the same direction (from the base end side of the blank B) into the bottom surface (which may be called the residual material portion) of the large-diametered recess 32 to form a shallow recess 36 by drawing, said recess 36 being smaller in diameter than the recess 32 and coaxially communicating with the latter. At this stage, therefore, an annular boundary step portion 38 is formed between the recesses 32 and 36 of different diameters, while a residual material portion remains on the front end side of the blank B. In other words, the small-diamtered shallow recess 36 is bottom-closed. The boundary step portion 38, of course, corresponds to the boundary step portion 16 of the product.

At the fourth step IV, to open the bottom of the small-diametered shallow recess 36 to the front end side of the blank B, a round bar-like punch (not shown) is similarly driven from the base end side of said blank B to punch the residual material portion. As a result, the blank B has two straight holes 40 and 42 formed therein communicating with each other. It goes without saying that the large-diametered straight hole 40 on the base end side becomes the straight hole 14 of said product.

Then, at the fifth step V, a taper punch (not shown) is driven from the larged-diametered straight hole 40 on the base end side to the small-diametered straight hole 42 on the fornt end side so as to deform only the small-diametered straight hole 42 on the front end side into a taper hole 12. Subjected to such stepwise action of plastic deformation, the blank B is elongated from the initial cut length L2, thereby providing a hollow sleeve type anchor body 10 having a fixed length L1.

Subsequently, at the sixth step VI, spreading-purpose slits 18 in plus-sign or minus-sign from are cut in substantially the front half of the anchor body 10, and at the seventh step VII, a separately prepared plug 22 is inserted into the hollow space of the anchor body 10 from the straight hole 14 on the base end side. This is made possible by placing a plug inserting device in the production line shown in FIG. 4, whereby plugs 22 can be automatically and continuously inserted.

Finally, at the eighth step VIII, with the plug 22 thus inserted, the straight hole 14 on the base end side of the anchor body 10 is subjected to rolling to form an internal thread 24 whose inner diameter D1 is smaller than the outer diameter D2 of the plug 22. Thus, the crest portion of the internal thread 24 bulging by a predetermined amount W prevents the plug 22 from moving back until it slips off the base end side of the anchor body. Further, such process for slip-off prevention with respect to the anchor body 10 can be completed by the single step of rolling the internal thread 24 (i.e., the eighth step VIII). This accounts for the fact that the invention is suitable for mass-production of such machine element to be used in large quantity. In addition, in rolling operation at the step VIII, by maintaining the anchor body 10 in the illustrated vertical or other raised position, the plug 22 can be held in its inserted state without any trouble and hence the rolling of the internal thread 24 can, of course, be smoothly and stably effected.

As described above, according to the present invention, after the plug 22 has been inserted into the hollow inner space of the anchor body 10, the rolling of the internal thread 24 of the anchor body 10 is carried out, whereby the prevention of slip-off of the plug 22 is attained through the deformation of the material bulging by a predetermined amount W and at the same time the threaded clamping engagement with the male screw 26 is made possible. Thus, the problems in the prior art article described at the outset can be eliminated and plug-containing type internally threaded anchors to be set in concrete which can be efficiently handled at laying sites can be mass-produced at low cost.

Figure 5:
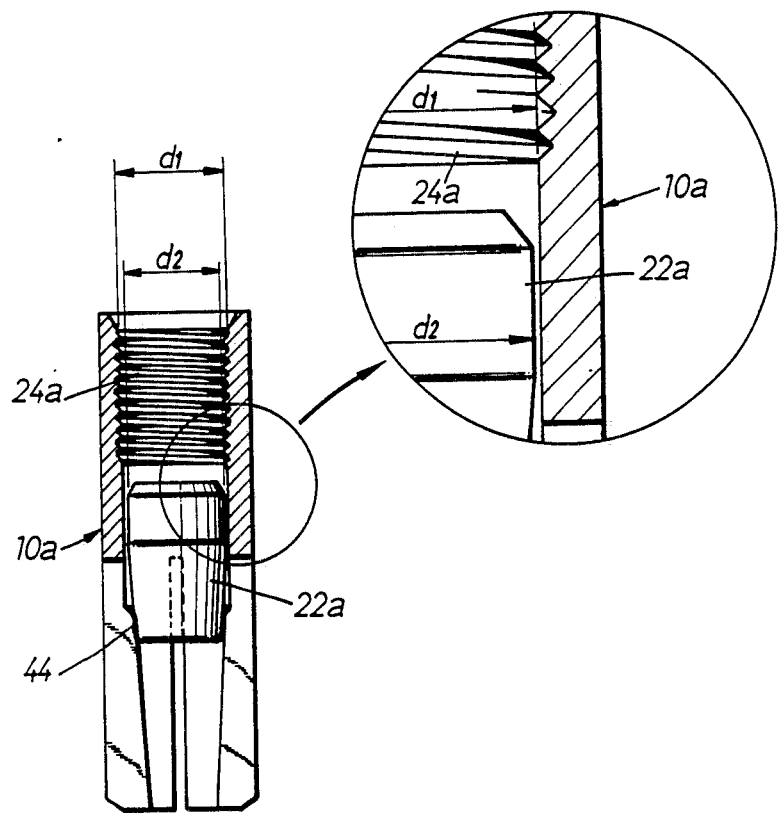
FIG. 5 is a sectional view of a conventional anchor shown for comparison with the anchor shown in FIG. 1.

In the case of the prior art product shown in FIG. 5, since the internal thread 24a formed in the anchor body 10a by cutting has an inner diameter d1 which is greater than the outer diameter d2 of the plug 22a, there is, of course, the danger of the plug slipping off the anchor body 10a. For this reason, an adhesive agent 44 is applied to the plug 22a or, alternatively, grease is filled into the anchor body 10a after the insertion of the plug, thereby holding the plugs 22a in position. With this approach, however, the holding operation must be effected by applying a manual operation to each anchor, which is very troublesome and can lead to an accidental ommision of application of the adhesive agent 44. Further, even if it is applied without fail, the drying or incomplete fixing can lead to the plug 22a slipping off the anchor body 10a.

In contrast, since the anchor of the present invention is a product in which the plug 22 is held in the anchor body 10 against slip-off by the crest portion of the internal thread 24 bulged by said rolling operation, there is no need for said troublesome manual operation and the product is qualitatively greately stabilized because of the prevention of slipoff. Thus, the use of this anchor greately increases the efficiency of laying operation in the field.

Figure 6:
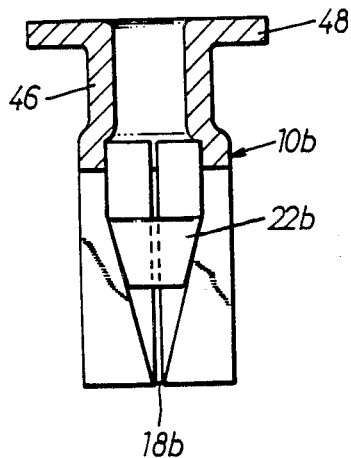
FIGS. 6 and 7 are sectional views of another conventional anchor, showing how it is used.
Figure 7:
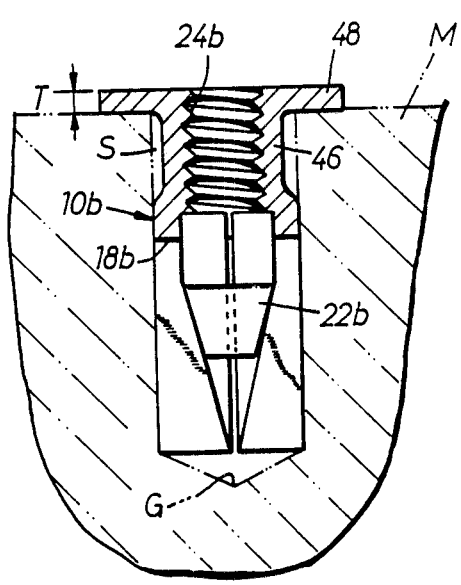

In the case of the known technique shown in FIGS. 6 and 7, after the plug 22b has been inserted, the anchor body 10b is locally squeezed by press operation to form a small-diametered neck portion 46 to thereby prevent slip-off of the plug 22b. Thus, in addition to the press operation for squeezing the small-diametered neck portion 46, the production requires the cutting of the internal thread 24b in the anchor body 10b, thus leading to increased cost and delayed shipment of such machine element to be used in large quantity. Moreover, since the squeezing of the small-diametered neck portion 46 by press operation is effected after the slits 18b have been cut in the anchor body 10b, the front end side of the anchor body 10b tends to accidentally spread from the slits 18b, making the quality unstable, and such spreading makes it difficult to embed the anchor smoothly and accurately in the embedment hole G of the concrete structure M.

In contrast, in the present invention, the prevention of slip-off of the plug 22 can be attained by simply rolling the internal thread 24 in the anchor body 10 and said internal thread 24 also serves for threaded engagement with the male screw 26 for attaching the hardware A; thus, mass-production effect can be expected to the fullest extent, and, moreover, it is possible to provide a highly accurate product of stabilzed quality.

Further, in the known technique shown in FIGS. 6 and 7, the squeezed small-diametered neck portion 46 serves to prevent slip-off of the plug 22b, and the internal thread 24b imparted thereto does not originally function to prevent slip-off of the plug 22b. Further, since the internal thread 24b is formed by cutting operation, cutting chips tend to stick to or accumulate in the interior of the anchor body 10b and it is very difficult to uniform the quality of the internal thread in a very narrow range. And from the standpoint of threaded engagement with the male screw, there is a problem that the internal thread is inferior in strength to resist loads acting in the direction to pull out the male screw.

In the present invention as contrasted therewith, since the internal thread 24 is formed by rolling operation involving plastic deformation of metal blank, the problems described above do not arise and the mechanical properties of the product can be effectively improved while the blank itself can be fully utilized without any loss of material and the formation can be efficiently completed in a short time.

Further, in the aforesaid known technique, the surface configuration of the anchor body 10b reduced in diameter at the small-diametered neck portion 46 necessarily results, as can be seen from FIG. 7, in a clearance S being formed between the embedment hole G of the concrete structure M and the anchor body when the latter is embedded therein, correspondingly reducing the strength of grip on the concrete structure M. In this connection it is to be noted that if the overhanging flange 48 of the anchor body is absent, the clearance S could not be covered from sight and the decorative effect would be degraded. On the other hand, the presence of the flange 48 which overhangs results in said flange projecting above the surface of the concrete structure by an amount corresponding to its thickness T, making it impossible to set hardware on the surface of the structure M in a stabilized manner.

In this respect, according to the present invention, the anchor body 10 is not formed with the aforesaid small-diametered neck portion 46 or overhanging flange 48 and instead it is in the form of a straight cylinder with the fixed original diameter of the round bar blank maintained throughout the process, so that it can be easily and correctly embedded in the embedment hole G of the concrete structure M without the aforesaid problems and the grip on the structure M can be increased. Thus, the invention is pracically useful.

What is claimed is:

1. A method of producing a plug-containing type internally threaded anchor to be set in concrete, comprising the steps of:

die-making a substantially hollow cylindrical anchor body (10) by stepwise plastically processing a round bar blank (B) cut to a required length (L2) to form a small-diametered taper hole (12) on its front end side and a large-diametered straight hole (14) on its base end side coaxially communicating with said taper hole, cutting spreading-purppose slits (18) in the front end side of the anchor body (10), inserting a plug (22) serving as a spreadingpurpose wedge into the hollow inner space of the anchor body (10) from the straight hole (14) on the base end side, and with said plug (22) inserted in said anchor body, forming by rolling operation an internal thread in the straight hole (14) of the anchor body (10), the inner diameter (D1) of said internal thread being smaller than the outer diameter (D2) of the plug (22).

2. A method of producing a plug-containing type internally threaded anchor to be set in concrete as set forth in claim 1, characterized in that in diemaking the anchor body (10), straight holes (40, 42) of different diameters coaxially communicating with each other are formed in the round bar blank (B) cut to a required length (L2), by deep-forging operation in one direction from the base end side and then a taper punch is thrusted from the large-diametered straight hole (40) on the base end side toward the small-diametered straight hole (42) on the base end side to thereby deform the small-diametered straight hole (42) alone into a taper hole (12).

* * * * *